United States Patent [19]

Thompson

[11] 4,407,600
[45] Oct. 4, 1983

[54] TURNBUCKLE BOOT COVER

[76] Inventor: David M. Thompson, 803 Mentoloking Rd., Brick Town, N.J. 08723

[21] Appl. No.: 305,152

[22] Filed: Sep. 24, 1981

[51] Int. Cl.³ ............................................. F16B 11/00
[52] U.S. Cl. ..................................... 403/23; 403/286; 403/43; 114/109; 52/147; 174/136
[58] Field of Search ................... 403/23, 286, 43, 288, 403/50; 277/212 FB; 114/109, 223; 174/93, 136; 52/147

[56] References Cited

U.S. PATENT DOCUMENTS

| 2,943,140 | 6/1960 | Bender | 174/93 |
| 2,978,075 | 4/1961 | Newton | 403/23 X |
| 4,231,208 | 11/1980 | Willox | 174/136 |

FOREIGN PATENT DOCUMENTS 1159536 12/1963 Fed. Rep. of Germany ........ 174/93
2623576 12/1977 Fed. Rep. of Germany ...... 114/109

Primary Examiner—Andrew V. Kundrat
Attorney, Agent, or Firm—Charles F. Gunderson

[57] ABSTRACT

A boot cover for turnbuckles and the like has an upper cap portion that fits around a stay, and fits snugly over an elongated central portion that covers the entire turnbuckle. Both the upper cap portion and the elongated central portion are made of resilient material and are slotted, or openable, and may be stretched apart to permit both portions to be fitted around the stay and turnbuckle assembly to cover the assembly to reduce abrasion of the sails or any cordage that must pass by the turnbuckle area. The lower portion of the turnbuckle and chain plate may also be covered by a lower cap portion that also fits snugly over the elongated central portion, and is also slotted to fit over the lower portion of the turnbuckle and chain plate without removing them or disconnecting them.

4 Claims, 8 Drawing Figures

TURNBUCKLE BOOT COVER

BACKGROUND OF THE INVENTION

Turnbuckles have many uses and are essential for tightening or adjusting the tension on a guy wire of any kind. They are invaluable, of course, in sailing vessels that must have stays to support tall masts. If nothing interferes with a turnbuckle, there is little or no problem. However, the sails of modern vessels tend more and more to overlap the stays with inevitable abrasion of the sails against the metal stays and turnbuckles. Genoa jibs and spinakers, in particular, are usually drawn or clewed aft of the stays and turnbuckles, and Genoa jibs may be brought in close contact with the stays and their turnbuckles outside, or even inside, of the stays on a beat to windward.

The standard turnbuckles are larger than the stays, and with necessary fittings and fastenings, have rougher exteriors than the stays, and while the newer tubular casings may provide a smoother section for the central sleeve or base, the upper and lower threaded portions are still exposed and abrasive, and the couplings between the turnbuckles must be comparatively sharp edged, which all adds to the abrasion. These couplings must involve thimbles with some form of fastening—such as a "nicopress" fitting—or bolts with cotter pins or other devices projecting from the fastening.

This has necessitated the development of turnbuckle covers of various kinds, from tape or cord wrapings around the turnbuckle and fastenings to plastic covers that surround the turnbuckle and its fastenings. However, the existing plastic covers are of one piece, and require the complete removal of the turnbuckle from the stay or the chainplate before they can be fit over the turnbuckle. Even then, they may or may not cover the end couplings of the turnbuckle, they may not provide an effective waterseal, and they tend to be bulky and cumbersome in appearance.

It is therefore an object of this invention to provide a turnbuckle boot cover that can be fit over a turnbuckle and its appendages, quickly and easily, without disconnecting the turnbuckle from its chain plate or stay. It is a further object of this invention to provide a turnbuckle boot cover that can be easily removed for adjustment of the turnbuckle. It is a further object of this invention to provide a simple, economical cover for a turnbuckle and its fastenings that will reduce chaffing of sails and cordage, protect the turnbuckle from the elements, and generally improve the appearance of the standing rigging of a sailing vessel.

SUMMARY OF THE INVENTION

A turnbuckle boot cover is formed of flexible material in a cylindrical form large enough to contain the bulk of a turnbuckle, and long enough to extend past its fastenings. A slot or overlapping portion extends the length of the sleeve, and can be pulled apart to wrap the sleeve around the turnbuckle without loosening it or removing it from the chainplate or stay. An upper cap is provided with an outer sleeve slightly larger than the elongated central sleeve. This is also slotted and has a central hole the size of the stay, to be fitted around the stay and down over the upper end of the elongated central sleeve. A lower cap is also provided with an outer sleeve slightly larger than the elongated central sleeve. This is also slotted and has a central hole large enough to accomodate the upper portion of the chain plate or its coupling to the turnbuckle, and the outer sleeve fits over the lower end of the elongated central sleeve to enclose it and secure it. The upper and lower caps may also have an inner cap sleeve slightly smaller than the inner diameter of the elongated central sleeve, to overlap and further secure and seal the elements together.

DETAILED DESCRIPTION OF THE DRAWINGS

Figure 1:
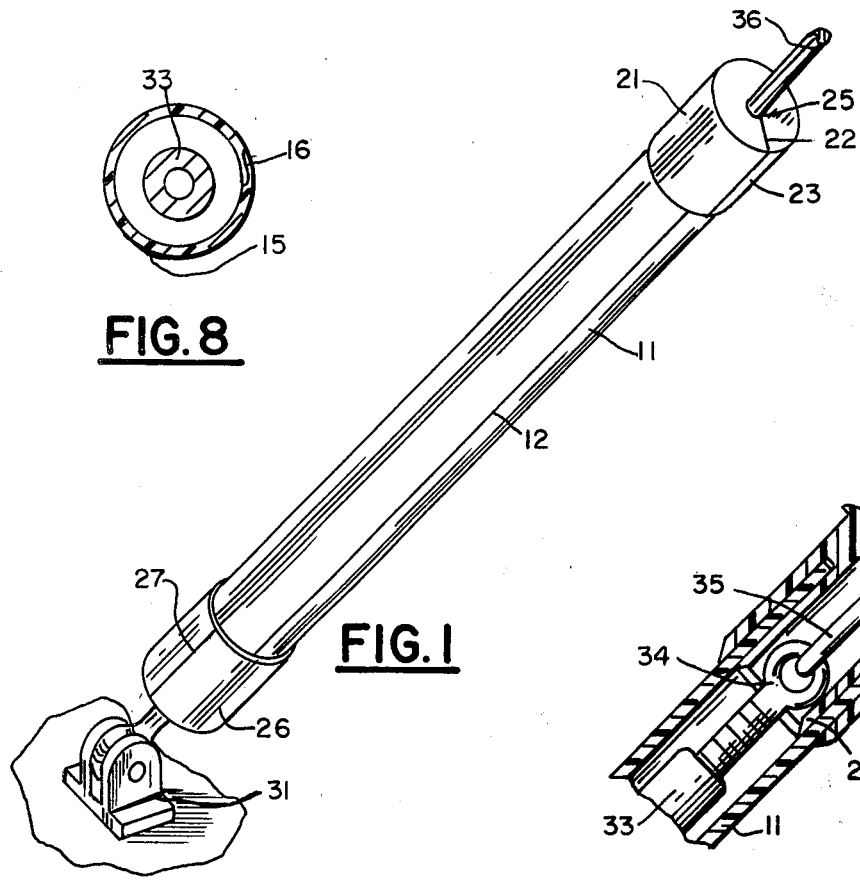
FIG. 1 is an isometric view of the device.

Referring now more particularly to FIG. 1, an isometric view of the device is shown, in position, with an elongated sleeve 11 with an axial slot 12 extending the length of the sleeve. A upper cap 21 is fitted over the central sleeve 11. The upper cap has a slot 22 and an opening 25 to fit around a stay 36, and its outer sleeve portion 23 extending downward is just large enough to fit over the upper end of the elongated slotted sleeve 11, and is long enough to provide a good bond with the central sleeve.

A lower cap 26 is also provided for the lower end of the central sleeve. The lower cap—seen better in FIG. 4—also has a slot 27 and an opening to fit around the lower end of the turnbuckle where it joins a chain plate 31. The lower cap may also cover the chain plate; depending on the shape and size of the chain plate, and whether any significant abrasion may be expected from it. The lower cap also has a sleeve which extends upward and is large enough to fit over the lower end of the central sleeve, and is long enough to provide a good, tight connection with the central sleeve.

Figure 2:
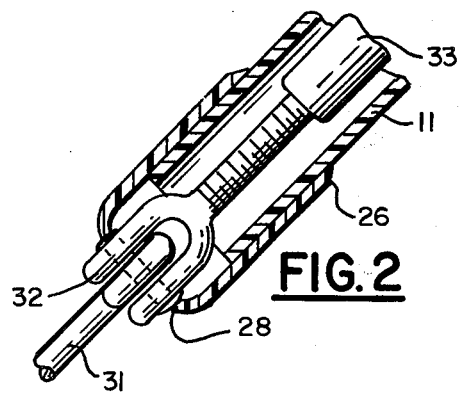
FIG. 2 is a partial cross section of the lower cap portion.

FIG. 2 is a partial cross section of the coupling of the lower end of the sleeve and cap, with similar elements similarly numbered. This shows more clearly the lower portion of a turnbuckle with its threaded portion screwed into the bottom of a turnbuckle base or center portion 33. This also shows an opening 28 of the lower cap, not visible in FIG. 1, that may fit around a turnbuckle eye 32 that is coupled to the chain plate 31. As noted earlier, the lower cap could be extended to cover the chain plate, where this is practical or desireable.

Figure 3:
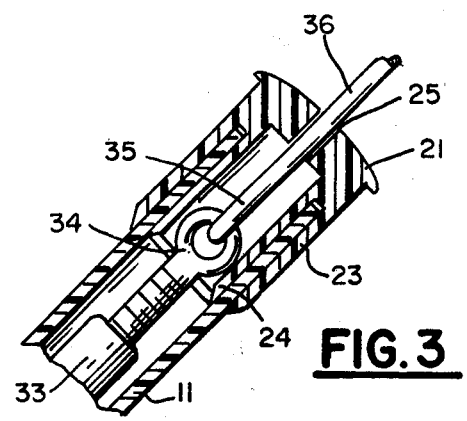
FIG. 3 is a partial cross section of the upper cap portion.

FIG. 3 is a partial cross section of the coupling of the upper end of the central sleeve and upper cap, with similar elements similarly numbered. This also shows the opening 25 in the upper cap 21 for the stay or shroud 36, which is coupled through a thimble 35 to an upper turnbuckle eye 34 which terminates in a threaded portion that is screwed into the top of the turnbuckle base 33. This figure also shows on alternate species of cap with an inner sleeve 24 as well as the outer cap sleeve 23.

Figure 4:
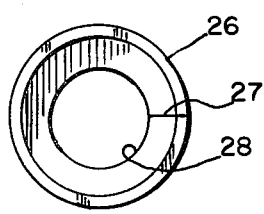
FIG. 4 is a view of the lower cap.

FIG. 4 is a top view of the lower cap 26 with its slot 27 and its opening 28, which must be large enough to accomodate the lower eye or chain plate. For any specific situation, this opening could be shaped to precisely fit a given shaped chain plate or the like.

Figure 5:
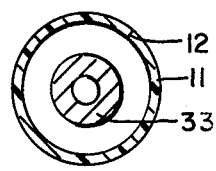

FIG. 5 is a cross section of a typical central section 11 around a turnbuckle base 33. This species shows a slot 12 for mounting the elongated sleeve around the turnbuckle.

Figure 7:
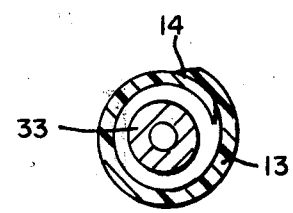
Figure 6:
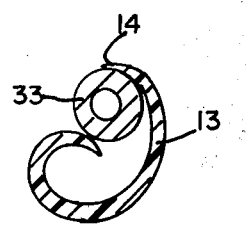

FIGS. 6 and 7 show cross sections of the central sections of another species with elongated sleeves 13 that have overlapping portions 14 that may be opened, as seen in FIG. 6, to fit around the turnbuckle base 33, and then closed to seal and protect the turnbuckle as seen in FIG. 7. This species might provide a tighter sealing central portion, but may be more difficult to put on and take off.

Figure 8:
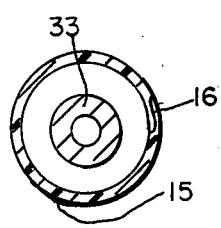
FIGS. 5, 6, 7, and 8 are cross sections of assorted species of central sleeves.

Still another species of elongated central sleeve 15 is seen in FIG. 8. Here the sleeve 15 has an overlapping slot 16 that provides a tighter seal around the turnbuckle base 33, while retaining a smooth cylindrical form, as in the species of FIG. 5. This would be more compatible with the cylindrical sleeves of the upper and lower caps 21 and 26, while providing the tighter seal of the overlapping species.

The elongated cylindrical central sleeves of any of the species can be molded or extruded in any manner well known in the art. They can be of any size and thickness to accomodate larger or smaller turnbuckles, and the degree of abrasion that may be anticipated. They may be of any of the well known plastics that are available for similar purposes, with the predictalbe resilience and other characteristics.

Actually, if the upper cap is molded, which is probable, it may be elongated to include the central portion, with a continuous slotted sleeve. This could be of almost any length to accomodate almost any turnbuckle of a given diameter, and may be cut off at any desired length to provide a universal unit adaptable to many situations. The lower cap may be used as before, and may be of any of the species shown or described. This could provide a simpler, tighter, more waterproof, and more esthetic turnbuckle boot.

In practice, the seem of the cap and elongated sleeve can be taped with a waterproof plastic tape to further secure and waterproof the turnbuckle boot. In some situations, the elongated sleeve may overlap the lower end of the turnbuckle and chain plate without actually requiring a lower cap. This would satisfy the abrasion requirements, and could be esthetically acceptable, although it would not provide as good a seal as a unit with both top and bottom caps.

It is to be understood that I do not wish to be limited to the exact details of construction shown and described since obvious modifications will occur to a person skilled in the art.

I claim:

1. A turnbuckle boot cover comprising an elongated cylindrical central sleeve portion having a continuous axial slot, said central portion extending beyond a given turnbuckle in both directions; an upper cap having a top portion, a first cylindrical sleeve portion, and a second cylindrical sleeve portion, said upper cap top portion having a centrally-located hole the size of a given stay; said first upper cap sleeve portion having an inner diameter the size of the outer diameter of said central sleeve portion; said second upper cap sleeve portion having an outer diameter the size of the inner diameter of said central sleeve portion; said upper cap having an axial slot extending from said centrally-located hole through said top and sleeve portions; a lower cap having a bottom portion and a cylindrical sleeve portion; said lower cap bottom portion having a centrally-located hole to accomodate the lower connection of said turnbuckle to a given surface; said lower cap sleeve portion having an inside diameter the size of said outer diameter of said central sleeve portion; said lower cap having an axial slot extending from said centrally-located hole, through said bottom and sleeve portions; said elongated central sleeve, and said upper and lower caps, being of a resilient material whereby said slots can be spread apart to fit around the appropriate parts of said turnbuckle, stay, and lower connection; and said upper and lower cap portions can be fitted over the upper and lower ends of said central sleeve portion to seal said turnbuckle boot cover and reduce abrasion of adjacent sails or cordage.

2. A turnbuckle boot cover as in claim 1 wherein said slot in said elongated central sleeve portion comprises overlapping axial flaps.

3. A turnbuckle boot cover as in claim 1 wherein said lower cap includes an additional inner cylindrical sleeve portion having an outer diameter the size of said inner diameter of said elongated central sleeve portion to fit within the lower end of said central sleeve portion and further seal and secure said lower cap and central sleeve; said axial slot in said lower cap extending through said inner sleeve.

4. A turnbuckle boot cover as in claim 1 wherein said upper cap cylindrical sleeve portion and its axial slot extends the length of said turnbuckle and its lower fastenings to provide a smoother and more watertight cover.

* * * * *